United States Patent
Prabhaker

(10) Patent No.: US 6,711,253 B1
(45) Date of Patent: Mar. 23, 2004

(54) METHOD AND APPARATUS FOR ANALYZING PERFORMANCE DATA IN A CALL CENTER

(75) Inventor: Gokul Chander Prabhaker, Northglenn, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/498,173

(22) Filed: Feb. 4, 2000

(51) Int. Cl.[7] .............................. H04M 3/36; H04M 7/00
(52) U.S. Cl. .............................. 379/265.01; 379/265.03; 379/265.06; 379/265.02
(58) Field of Search ...................... 379/265.01–265.14, 379/266.01–266.1, 309

(56) References Cited

U.S. PATENT DOCUMENTS

| | | | |
|---|---|---|---|
| 5,111,391 A | | 5/1992 | Fields et al. ................ 364/401 |
| 5,164,983 A | * | 11/1992 | Brown et al. ................ 379/265 |
| 5,289,368 A | | 2/1994 | Jordan et al. ................ 364/401 |
| 5,390,243 A | * | 2/1995 | Casselman et al. .......... 379/265 |
| 5,500,795 A | * | 3/1996 | Powers et al. ............... 364/401 |
| 5,684,964 A | * | 11/1997 | Powers et al. ............... 364/401 |
| 5,915,012 A | * | 6/1999 | Miloslavsky ................. 379/220 |
| 5,926,538 A | * | 7/1999 | Deryugin et al. ............ 379/265 |
| 5,940,496 A | * | 8/1999 | Gisby et al. ................. 379/265 |
| 6,044,355 A | * | 3/2000 | Crockett et al. ................ 705/8 |
| 6,055,308 A | * | 4/2000 | Miloslavsky et al. ........ 379/265 |
| 6,115,462 A | * | 9/2000 | Servi et al. .................. 379/221 |
| 6,175,564 B1 | * | 1/2001 | Miloslavsky et al. ........ 370/352 |
| 6,185,292 B1 | * | 2/2001 | Miloslavsky ................. 379/265 |
| 6,278,777 B1 | * | 8/2001 | Morley et al. ............... 379/265 |
| 6,356,632 B1 | * | 3/2002 | Foster et al. ........... 379/265.04 |
| 6,424,709 B1 | * | 7/2002 | Doyle et al. ................. 379/265 |
| 6,490,350 B2 | * | 12/2002 | McDuff et al. ......... 379/265.06 |
| 6,560,649 B1 | * | 5/2003 | Mullen et al. ............... 709/226 |

* cited by examiner

Primary Examiner—William J. Deane, Jr.
(74) Attorney, Agent, or Firm—Sheridan Ross P.C.

(57) ABSTRACT

A system for analyzing call center operations data retrieves data from a memory unit associated with a call center and then processes the data to determine agent composition and occupancy information for the call center on a representative working day. A number of different heuristics are provided for analyzing the operations data to identify one or more representative days corresponding to at least one user-specified call center operating parameter and at least one user-specified call center skill. The operations data is then analyzed further to identify agent groups within the call center on the representative day(s) that share a common skill set. Occupancy information is then developed for the identified agent groups for the representative working day(s). The system then generates one or more reports indicating the agent composition and occupancy information for the representative day(s).

50 Claims, 10 Drawing Sheets

FIG. 2

REPRESENTATIVE DAY AND AGENT COMPOSITION/OCCUPANCY ANAYSIS

- 42 — MAIN PHONE NUMBER: (916)394-2603  FORMAT "(AAA)NNN-MMMM"   ACD: 1
- 44 — CUSTOMER NAME:
- 46 — REFERENCE DATE 1 (mm/dd/yyyy):  __/__/__   REFERENCE DATE 2 (mm/dd/yyyy): __/__/__
- 48 — REFERENCE ATTRIBUTES:
  - ACD CALLS
  - AVG SPEED OF ANS
  - HANDLE TIME
  - ABAN-CALLS

| | |
|---|---|
| 50 — STRATEGY:<br>○ 1. SKILLS GROUPED TOGETHER<br>⦿ 2. SKILLS EVALUATED SEPARATELY<br>○ 3. USER SELECTED DATE<br>   (IF YOU HAVE CHOSEN ONLY<br>   ONE REFERENCE ATTRIBUTE) | TOLERANCE IS PERCENTAGE<br>FOR STRATEGIES (2) AND (3),<br>AND ANY NUMBER FOR STRATEGY (1).<br><br>TOLERANCE: 20 |
| 52 — AGENT GROUPING CRITERIA | ⦿ EXACT MATCH (IN EXACT<br>   ORDER OF ADMINISTRATION)<br>○ FUNCTIONAL MATCH |
| 54 — PERFORM SKILL FILTERING FOR AGENT REPORTS? | ○ NO  ⦿ YES |

56 — ENTER COMMA SEPARATED SKILL LIST FOR ANALYSIS: ____

OR CLICK THE GETSKILLS BUTTON TO RETRIEVE A LIST OF ALL ADMINISTERED SKILLS      [GETSKILLS] — 60

62 — [ANALYZE]   [REANALYZE] — 64   [CHECK] — 66

IF YOU HAVE CONNECTION PROBLEMS, YOU CAN WRITE THE CUSTOMER IL BELOW TO GET THE LIST OF CMSs AND THEIR MODEM NUMBERS
ENTER CUSTOMER IL: ____

FIG. 3
REPRESENTATIVE DAY AND AGENT COMPOSITION/OCCUPANCY ANAYSIS

- 42 — MAIN PHONE NUMBER: (916)394-2603  FORMAT "(AAA)NNN-MMMM"  ACD: 1
- 44 — CUSTOMER NAME: 
- 46 — REFERENCE DATE 1 (mm/dd/yyyy):  /  /    REFERENCE DATE 2 (mm/dd/yyyy):  /  /
- 48 — REFERENCE ATTRIBUTES:
  - ACD CALLS
  - AVG SPEED OF ANS
  - HANDLE TIME
  - ABAN-CALLS 50:
STRATEGY:
- ○ 1. SKILLS GROUPED TOGETHER
- ◉ 2. SKILLS EVALUATED SEPARATELY
- ○ 3. USER SELECTED DATE
  (IF YOU HAVE CHOSEN ONLY
  ONE REFERENCE ATTRIBUTE)

TOLERANCE IS PERCENTAGE FOR STRATEGIES (2) AND (3), AND ANY NUMBER FOR STRATEGY (1).

TOLERANCE: 20

52: AGENT GROUPING CRITERIA
- ◉ EXACT MATCH (IN EXACT ORDER OF ADMINISTRATION)
- ○ FUNCTIONAL MATCH

54: PERFORM SKILL FILTERING FOR AGENT REPORTS?  ○ NO  ◉ YES

56 — ENTER COMMA SEPARATED SKILL LIST FOR ANALYSIS:
Select one or more skills (Press Ctrl key for multiple selects)

```
22  Collections|
31  Business Sales Department|
10  Sales Department|
301
302
311
312 800 940 2053|
206 Skill 207 Backup|
208 Customer Service Weekend|
204 Skill 205 Backup|
202 Skill 203 Backup|
201 |
95  |
205 |
203 |
```

62 — [ANALYZE] [REANALYZE] [CHECK]

IF YOU HAVE CONNECTION PROBLEMS, YOU CAN ENTER THE CUSTOMER ID BELOW TO GET THE LIST OF CMSs AND THEIR MODEM NUMBERS NEW
ENTER CUSTOMER ID:

FIG. 4

STRATEGY: NORMALIZED EUCLIDEAN MEASURE. TOLERANCE:20
REPRESENTATIVE DAYS FOUND FOR THE DESIRED ATTRIBUTE COMBINATION ARE AS FOLLOWS:

03/02/1999
- Sample Agent Composition Summary Report
- Sample Agent Composition Typewise Interval Report
- Sample Agent Composition Intervalwise Type Report 03/04/1999
- Sample Agent Composition Summary Report
- Sample Agent Composition Typewise Interval Report
- Sample Agent Composition Intervalwise Type Report 03/05/1999
- Sample Agent Composition Summary Report
- Sample Agent Composition Typewise Interval Report
- Sample Agent Composition Intervalwise Type Report 03/12/1999
- Sample Agent Composition Summary Report
- Sample Agent Composition Typewise Interval Report
- Sample Agent Composition Intervalwise Type Report 03/19/1999
- Sample Agent Composition Summary Report
- Sample Agent Composition Typewise Interval Report
- Sample Agent Composition Intervalwise Type Report 03/26/1999
- Sample Agent Composition Summary Report
- Sample Agent Composition Typewise Interval Report
- Sample Agent Composition Intervalwise Type Report 04/02/1999
- Sample Agent Composition Summary Report
- Sample Agent Composition Typewise Interval Report
- Sample Agent Composition Intervalwise Type Report

FIG. 5

STRATEGY: NORMALIZED EUCLIDEAN MEASURE. TOLERANCE: 300
REPRESENTATIVE DAYS FOUND FOR THE DESIRED ATTRIBUTE COMBINATION ARE AS FOLLOWS:

03/03/1999

- Sample Agent Composition Summary Report
- Sample Agent Composition Typewise Interval Report
- Sample Agent Composition Intervalwise Type Report

04/02/1999

- Sample Agent Composition Summary Report
- Sample Agent Composition Typewise Interval Report
- Sample Agent Composition Intervalwise Type Report

FIG. 6

AGENT COMPOSITION SUMMARY REPORT

| QTY | TYPE | AGENT LOG-IDs OF THIS TYPE | INTERVAL | SKILLS (AND SKILL LEVELS) |
|---|---|---|---|---|
| 49.60 | 1 | 8010, 8402, 8003 | 0800-1900, 0830-1800, 1330-2000 | 490(0), 16(0), 0(0), 0(0), 0(0), 0(0), 0(0), 0(0), 0(0), 0(0), 0(0), 0(0), 0(0), 0(0), 0(0), 0(0), 0(0), 0(0), 0(0), 0(0) |
| 14.93 | 2 | 6785 | 1600-0100 | 401(0), 1(0), 400(16), 0(0), 0(0), 0(0), 0(0), 0(0), 0(0), 0(0), 0(0), 0(0), 0(0), 0(0), 0(0), 0(0), 0(0), 0(0), 0(0) |
| 0.70 | 3 | 6089 | 1600-1700 | 401(0), 1(0), 442(1), 52(1), 443(1), 412(1), 411(1), 51(1), 421(1), 432(1), 431(1), 403(1), 400(16), 0(0), 0(0), 0(0), 0(0), 0(0), 0(0), 0(0) |
| 14.27 | 4 | 6615 | 1630-0100 | 411(0), 1(0), 412(1), 400(16), 0(0), 0(0), 0(0), 0(0), 0(0), 0(0), 0(0), 0(0), 0(0), 0(0), 0(0), 0(0), 0(0), 0(0), 0(0) |
| 2.00 | 5 | 6951 | 1600-1730 | 52(0), 1(0), 442(1), 401(1), 443(1), 411(1), 412(1), 432(1), 431(1) 400(16), 0(0), 0(0), 0(0), 0(0), 0(0), 0(0), 0(0), 0(0), 0(0), 0(0) |
| 14.17 | 6 | 6741 | 1630-0100 | 412(0), 1(0), 401(1), 402(1), 442(1), 403(1), 52(1), 400(15), 0(0) 0(0), 0(0), 0(0), 0(0), 0(0), 0(0), 0(0), 0(0), 0(0), 0(0), 0(0) |
| 13.40 | 7 | 6587 | 1600-2300 | 400(0), 16(0), 0(0), 0(0), 0(0), 0(0), 0(0), 0(0), 0(0), 0(0), 0(0) 0(0), 0(0), 0(0), 0(0), 0(0), 0(0), 0(0), 0(0) |
| 15.33 | 8 | 6806 | 1600-0100 | 401(0), 1(0), 403(1), 402(1), 421(1), 52(1), 442(1), 400(16), 0(0) 0(0), 0(0), 0(0), 0(0), 0(0), 0(0), 0(0), 0(0), 0(0), 0(0) |

AGENT TYPEWISE COMPOSITION REPORT            FIG. 7

| QTY | TYPE | AGENT LOG-IDs OF THIS TYPE | INTERVAL->QTY | SKILLS (AND SKILL LEVELS) |
|---|---|---|---|---|
| 49.60 | 1 | 8010, 8402 8003 | 08:00-08:30->1.00<br>08:30-09:00->2.10<br>09:00-09:30->2.53<br>09:30-10:00->2.00<br>10:00-10:30->2.00<br>10:30-11:00->2.00<br>11:00-11:30->2.00<br>11:30-12:00->2.00<br>12:00-12:30->2.00<br>12:30-13:00->2.00<br>13:00-13:30->2.00<br>13:30-14:00->3.00<br>14:00-14:30->3.27<br>14:30-15:00->3.00<br>15:00-15:30->3.00<br>15:30-16:00->3.00<br>16:00-16:30->3.00<br>16:30-17:00->3.00<br>17:00-17:30->2.00<br>17:30-18:00->2.40<br>18:00-18:30->1.00<br>18:30-19:00->1.17<br>19:30-20:00->0.13<br>Total-49.60 | 490(0), 16(0), 0(0), 0(0), 0(0), 0(0), 0(0), 0(0), 0(0), 0(0), 0(0), 0(0), 0(0), 0(0), 0(0), 0(0), 0(0), 0(0), 0(0), 0(0) |
| 14.93 | 2 | 6785 | 16:00-16:30->1.00<br>16:30-17:00->1.47<br>17:00-17:30->1.00<br>17:30-18:00->1.00<br>18:00-18:30->1.00<br>18:30-19:00->1.00<br>19:00-19:30->1.00<br>19:30-20:00->1.00<br>20:00-20:30->1.00<br>20:30-21:00->1.00<br>21:00-21:30->1.00<br>21:30-22:00->1.00<br>22:00-22:30->1.00<br>22:30-23:00->1.00<br>23:30-24:00->0.47<br>Total-14.93 | 401(0), 1(0), 400(16), 0(0), 0(0), 0(0), 0(0), 0(0), 0(0), 0(0), 0(0), 0(0), 0(0), 0(0), 0(0), 0(0), 0(0), 0(0), 0(0), 0(0) |
| 0.70 | 3 | 6089 | 16:30-17:00->0.70<br>Total-0.70 | 401(0), 1(0), 442(1), 52(1), 443(1), 412(1), 411(1), 51(1), 421(1), 432(1), 431(1), 403(1), 400(16), 0(0), 0(0), 0(0), 0(0), 0(0), 0(0), 0(0) |
| 14.27 | 4 | 6615 | 16:30-17:00->1.00<br>17:00-17:30->1.97<br>17:30-18:00->1.00<br>18:00-18:30->1.00<br>18:30-19:00->1.00<br>19:00-19:30->1.00<br>19:30-20:00->1.00<br>20:00-20:30->1.00<br>20:30-21:00->1.00<br>21:00-21:30->1.00<br>21:30-22:00->1.00<br>22:00-22:30->1.00<br>22:30-23:00->1.00 | 411(0), 1(0), 412(1), 400(16), 0(0), 0(0), 0(0), 0(0), 0(0), 0(0), 0(0), 0(0), 0(0), 0(0), 0(0), 0(0), 0(0), 0(0), 0(0), 0(0) |

FIG. 8

| | | | 23:30-24:00->0.30<br>Total-14.27 | |
|---|---|---|---|---|
| 2.00 | 5 | 6951 | 16:00-16:30->1.00<br>16:30-17:00->0.43<br>17:00-17:30->0.57<br>Total-2.00 | 52(0), 1(0), 442(1), 401(1), 443(1), 411(1), 412(1), 432(1),<br>431(1), 400(16), 0(0), 0(0), 0(0), 0(0), 0(0), 0(0), 0(0), 0(0),<br>0(0), 0(0) |
| 14.17 | 6 | 6741 | 16:30-17:00->1.00<br>17:00-17:30->1.97<br>17:30-18:00->1.00<br>18:00-18:30->1.00<br>18:30-19:00->1.00<br>19:00-19:30->1.00<br>19:30-20:00->1.00<br>20:00-20:30->1.00<br>20:30-21:00->1.00<br>21:00-21:30->1.00<br>21:30-22:00->1.00<br>22:00-22:30->1.00<br>22:30-23:00->1.00<br>23:30-24:00->0.20<br>Total-14.17 | 412(0), 1(0), 401(1), 402(1), 442(1), 403(1), 52(1), 400(16),<br>0(0), 0(0), 0(0), 0(0), 0(0), 0(0), 0(0), 0(0), 0(0), 0(0), 0(0),<br>0(0) |
| 13.40 | 7 | 6587 | 16:00-16:30->1.00<br>16:30-17:00->1.47<br>17:00-17:30->1.00<br>17:30-18:00->1.00<br>18:00-18:30->1.00<br>18:30-19:00->1.00<br>19:00-19:30->1.00<br>19:30-20:00->1.00<br>20:00-20:30->1.00<br>20:30-21:00->1.00<br>21:00-21:30->1.00<br>21:30-22:00->1.00<br>22:30-23:00->0.93<br>Total-13.40 | 400(0), 15(0), 0(0), 0(0), 0(0), 0(0), 0(0), 0(0), 0(0), 0(0)<br>0(0), 0(0), 0(0), 0(0), 0(0), 0(0), 0(0), 0(0), 0(0), 0(0) |
| 15.33 | 8 | 5806 | 16:00-16:30->1.00<br>16:30-17:00->1.50<br>17:00-17:30->1.00<br>17:30-18:00->1.00<br>18:00-18:30->1.00<br>18:30-19:00->1.00<br>19:00-19:30->1.00<br>19:30-20:00->1.00<br>20:00-20:30->1.00<br>20:30-21:00->1.00<br>21:00-21:30->1.00<br>21:30-22:00->1.00<br>22:00-22:30->1.00<br>22:30-23:00->1.00<br>23:30-24:00->0.83<br>Total-15.33 | 401(0), 1(0), 403(1), 402(1), 421(1), 52(1), 442(1), 400(16),<br>0(0), 0(0), 0(0), 0(0), 0(0), 0(0), 0(0), 0(0), 0(0), 0(0), 0(0),<br>0(0) |

FIG. 9A

AGENT INTERVALWISE COMPOSITION REPORT WARNING: TIME MAY BE SKEWED BY AN HOUR DUE TO DST

| TYPE | 0:00 | 0:30 | 1:00 | 1:30 | 2:00 | 2:30 | 7:30 | 8:00 | 8:30 | 9:00 | 9:30 |
|---|---|---|---|---|---|---|---|---|---|---|---|
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0.1 | 1.5 | 2 | 2 |
| 5 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 |

FIG. 9B

| 10:00 | 10:30 | 19:30 | 20:00 | 20:30 | 21:00 | 21:30 | 22:00 | 22:30 | 23:00 | 23:30 | TOTAL | SKILL (AND SKILL LEVEL(s)) | AGENT(s) |
|---|---|---|---|---|---|---|---|---|---|---|---|---|---|
| 0 | 0 | 0 | 0 | 0 | 0 | 0 | 0 | 0 | 0 | 0 | 2 | 1(1), 52(0), 400(0), 401(1), 411(1), 412(1), 431(16), 432(1), 442(1), 443(1) | 8951 |
| 0 | 0 | 1 | 1 | 1 | 1 | 1 | 1 | 0.9 | 0 | 0 | 13.4 | 16(0), 400(0) | 4587 |
| 0 | 0 | 1 | 1 | 1 | 1 | 1 | 1 | 1 | 1 | 0.3 | 14.8 | 1(1), 400(0), 411(0), 411(16) | 6615 |
| 2 | 2 | 0.1 | 0 | 0 | 0 | 0 | 0 | 0 | 0 | 0 | 49.6 | 16(0), 490(0) | 8010, 8402, 9001 |
| 0 | 0 | 1 | 1 | 1 | 1 | 1 | 1 | 1 | 1 | 0.5 | 14.9 | 1(16), 400(0), 401(0) | 6765 |
| 0 | 0 | 0 | 0 | 0 | 0 | 0 | 0 | 0 | 0 | 0 | 0.7 | 1(1), 51(1), 52(1), 400(0), 401(0), 403(16), 411(1), 412(1), 421(1), 431(1), 482(1), 442(1), 443(1) | 6089 |
| 0 | 0 | 0 | 0 | 0 | 1 | 1 | 1 | 1 | 1 | 0.2 | 14.2 | 1(1), 52(16), 400(0), 401(1), 402(1), 403(1), 412(0), 442(1) | 6741 |
| 0 | 0 | 0 | 0 | 0 | 1 | 1 | 1 | 1 | 1 | 0.8 | 15.3 | 1(1), 52(1), 400(0), 401(0), 402(1), 403(1), 421(1), 442(16) | 6806 |

METHOD AND APPARATUS FOR ANALYZING PERFORMANCE DATA IN A CALL CENTER

TECHNICAL FIELD

The invention relates generally to call centers and, more particularly, to techniques for analyzing and reporting performance data in a call center.

BACKGROUND OF THE INVENTION

A call center is a facility that handles telephone calls for an organization, usually using some level of computer control. Typically, the telephone calls handled by a call center are incoming calls from present or potential customers of the organization. The incoming calls are generally distributed among a number of agents within the call center who are each trained to handle certain types of incoming calls. A call center will normally be capable of handling many different types of calls coming into the organization. For example, a call center may be set up to receive calls relating to each of a multitude of different products, product types, or product families sold by the corresponding organization. Alternatively, or in addition, a call center may be arranged to handle calls relating to different services or information dissemination functions provided by the organization. Some such services/functions include: taking product orders, providing customer service, providing pricing and/or availability information, or any of a variety of other functions. Many other types of calls can also be handled by a call center. The types of calls that are supported by a call center are commonly referred to as the "skills" of the call center.

As can be appreciated, management of a large call center can be a daunting task. For example, some call centers support hundreds of different skills and employ dozens of agents. Thus, it is often difficult to track the performance of the call center to identify possible areas of improvement or to devise optimization strategies. Traditionally, operations information relating to day-to-day call center activities has been tracked and stored in a computer memory within the call center. Typically, this information includes individual agent login/logout data, agent skill and skill level information, call handling information such as call duration and time to answer data, and other types of data related to call center operations. However, this information is usually voluminous and is therefore not generally of value to call center managers or others interested in enhancing call center performance. In addition, manual manipulation of these extensive call center records into a useful format for analysis can be extremely time-consuming, inaccurate, and is often not worth the effort.

Therefore, there is a need for a method and apparatus for analyzing call center operations data that is relatively simple to implement and that generates useful information for enhancing call center performance.

SUMMARY OF THE INVENTION

The present invention relates to a system for use in analyzing call center operations data. The system is capable of generating reports that can be used by call center managers and the like to make important decisions that can enhance call center performance. The system allows a user to specify one or more call center parameters and one or more call center skills for analysis. The system then analyzes operations data for the call center using one or more heuristics to identify one or more representative working days for the call center corresponding to the specified parameter(s) and skill(s). Once a representative working day has been identified, the system analyzes operations data for that day to identify groups of agents having common skills and common skill levels.

The occupancy of the identified agent groups are then developed from the operations data for subsequent reporting to the user. The occupancy of an agent group is related to the amount of time that agents within the group were "logged in" within the call center during the corresponding representative day. Once the occupancy information has been determined, the system allows the user to generate various reports indicating agent composition and occupancy levels within the call center on each representative working day. These reports can then be used by call center managers or others to support call center decision-making activities and/or to identify areas within the call center that require adjustment or personnel-related changes. Because the system is computer automated, the analysis is performed relatively rapidly and the results are accurate and consistent over time.

BRIEF DESCRIPTION OF THE DRAWINGS

FIGS. 2 and 3 are computer screen snapshots illustrating web pages that are generated as part of a web-based analysis tool for analyzing call center operations data in accordance with one embodiment of the present invention;

FIGS. 4 and 5 are computer screen snapshots illustrating web pages that are generated as part of a web-based analysis tool presenting analysis results to a user in accordance with one embodiment of the present invention;

FIGS. 6, 7, 8, and 9 are screen snapshots illustrating agent composition and occupancy reports that are generated in accordance with one embodiment of the present invention.

DETAILED DESCRIPTION

The present invention relates to a computer-automated system for use in analyzing the voluminous data records generated and maintained by a typical telephone call center. The system is capable of generating reports that can be used by call center managers and/or others to make decisions regarding call center operations that are designed to enhance call center performance. The system first identifies representative working days for a call center (using one or more heuristics) based upon one or more operational parameters and one or more call center skills specified for analysis by a user. The representative working days are days that are selected to represent typical call center operations for the specified parameter(s) and skill(s) based on past call center performance. The system then determines agent composition and occupancy information for the identified representative days and uses this information to generate reports for use in decision support for the call center. In a preferred embodiment, the system is arranged in a client/server configuration that allows various users to access the system to analyze data at any of a number of remote call centers via an intervening communications network. However, it should be appreciated that the principles of the present invention can also be implemented in various other configurations, such as being resident within a dedicated controller unit within an individual call center.

Figure 1:
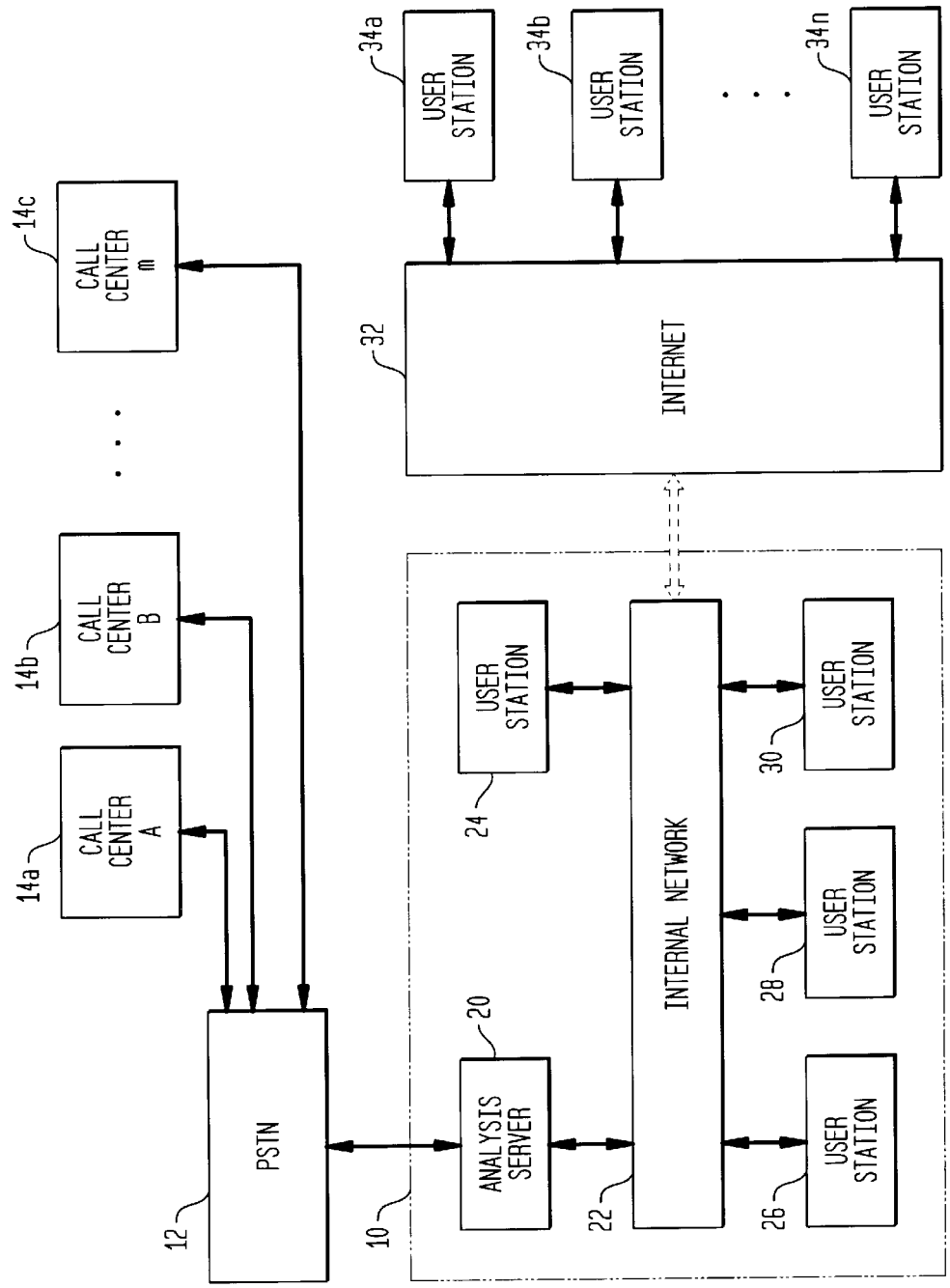
FIG. 1 is a block diagram illustrating a call center analysis arrangement in accordance with one embodiment of the present invention.

FIG. 1 is a block diagram illustrating a call center analysis arrangement in accordance with one embodiment of the present invention. A call center service provider organization 10 is coupled to a public switched telephone network (PSTN) 12 through which it can connect to any of a plurality of remote call centers 14a, 14b, . . . , 14m. The organization 10 includes an analysis server 20 that is capable of retrieving and analyzing call center operations data from any of the remote call centers 14a, 14b, . . . , 14m for purposes of generating reports related to past call center operations. These reports can then be used by employees of the call center service organization 10 to identify potential fixes, upgrades, or strategies for improving overall call center performance. Alternatively, or in addition, the reports can be delivered to the corresponding call center for review by call center personnel.

As illustrated in FIG. 1, the analysis server 20 is coupled to an internal communication network 22 within the organization 10. The internal communication network 22 allows the analysis server 20 to be accessed by employees of the organization 10 located at internal user stations 24, 26, 28, 30 (e.g., desktop personal computers and the like). The internal communication network 22 is also connected to the Internet, and authorized users, as long as they are within the organization's "firewall", can access the server 20. The external user stations 34a, 34b, . . . , 34n can be located, for example, within the remote call centers 14a, 14b, . . . , 14 thereby allowing call center managers to generate reports themselves.

In a preferred embodiment, the analysis server 20 provides a web-based analysis tool to users to analyze call center operations data within a selected remote call center. Upon entering an appropriate domain name in a web browser, a user is presented with a web page requesting various pieces of information regarding the analysis to be performed, including identification of the call center to be analyzed and the specific operational parameter(s) and call center skill(s) to be analyzed. The user then enters the requested information and presses a screen button to start the analysis. The analysis server 20 then contacts the identified call center to access the necessary data records to perform the requested analysis. The analysis server 20 then analyzes the operations data to generate one or more reports indicating, for example, agent composition and occupancy on "representative" working days. The reports can then be reviewed onscreen by the requesting user or they can be printed or stored for later review. As used herein, the term "agent composition" refers to the identification of individual "agent groups" within the call center that each include one or more agents that share a common set of skills and skill levels. The term "occupancy" relates to the amount of time that individual agents within an identified agent group were "logged in" at the call center during a corresponding representative working day.

FIG. 2 is a screen snapshot of an initial web page 40 that is presented to a user upon accessing the analysis server 20 of FIG. 1 in one embodiment of the present invention. As illustrated, the initial web page 40 solicits information from the user regarding the analysis to be performed, using a graphical user interface (GUI) approach. After the user has entered the requested information, the user presses the button 62 labeled "Analyze" on the web page 40 and the analysis is initiated. After the analysis has completed, the user is given the option to review any of a number of different reports that were generated during the analysis. In a preferred approach, the reports are arranged by representative day and the user selects a report by clicking on a hypertext report title using a mouse or similar pointing device. In general, each of the reports provides information regarding agent composition and occupancy on a corresponding representative day in a unique format.

With reference to FIG. 2, in a first line 42 of the web page 40, a telephone number associated with the call center to be analyzed is solicited. This telephone number will eventually be used by the analysis server 20 to access the corresponding call center to retrieve call center operations information therefrom. In a second line 44 of the web page 40, the name of the customer of the call center service organization 10 that is associated with the call center being analyzed is solicited. This customer name input is optional and can be used by the analysis server 20 in, among other things, generating reports associated with the call center or for later cross reference. In a next line 46, the web page 40 solicits the entry of an analysis start date and an analysis stop date for defining the period of time for which data analysis will be performed. This period of time will generally be used to limit the amount of data retrieved from the identified call center.

In a subsequent line 48, the web page 40 requires the entry of one or more call center operational parameters (referred to as "reference attributes") to be analyzed. The analysis server 20 will limit its analysis of the retrieved operations data to the operational parameter(s) identified by the user. In the illustrated embodiment, the operational parameters are selected by highlighting one or more of the listed parameters using, for example, a mouse. The operational parameters that are available for analysis in the illustrated embodiment include: call volume, average speed of answer, number of abandoned calls, and call handling time. As can be appreciated, any of a large number of other operational parameters can also be made available in accordance with the present invention.

In line 56 toward the bottom of web page 40, the user is asked to specify the skill or skills to be analyzed. Each of the skills available in a call center is typically identified by a skill number. The user simply lists the skills he wants analyzed within the appropriate box, separated by commas. If the user doesn't know which skills are available for a particular call center, he can press a button 60 labeled "getskills" on the web page 40 that will retrieve a list of available skills for the specified call center. In one approach, the analysis server 20 will dial the telephone number specified in line 42 of web page 40 to retrieve the list. Once the list has been retrieved, a new web page 70 that includes the list of available skills (see FIG. 3) is displayed. The user then selects one or more skills from the list by highlighting the appropriate entries using, for example, a mouse.

Referring back to FIG. 2, the web page 40 includes a first selection box 50 that requires the user to choose an analysis strategy for use in analyzing the retrieved operations data to identify the representative working day(s). The analysis server 20 can use any of a number of different heuristics to efficiently analyze the call center operations data to determine a representative day. The availability of different heuristics to perform the representative day analysis provides flexibility to the user in identifying appropriate representative days. For example, a user may decide to perform the representative day analysis using two different heuristics and then select a representative day that was identified by both of the different heuristics.

In a preferred embodiment, three different heuristics are provided for use in identifying representative working days for a specified parameter set and a specified skill set. A first heuristic, referred to herein as the Euclidean measure, views all skills in the specified skill set as part of a single vector space and uses Euclidean distance to measure the variation of the trend of the specified parameter set (within the specified analysis time period) with the actual trend for the specified dates. The Euclidean measure is typically appropriate when the specified skill set includes skills that are highly interrelated. An example of two skills that are typically highly interrelated in a call center are "Sales" and "Marketing." With reference to FIG. 2, the Euclidean measure analysis method is selected by choosing the first radio button within the selection box 50 labeled "Skills Grouped Together."

A second heuristic, referred to herein as the normalized Euclidean measure, views each skill in the specified skill set as an independent vector space. Thus, individual days that match the mean trends of the selected metric parameters are first found for each skill and then days common to all of the selected skills are identified as the representative days. The normalized Euclidean measure is typically appropriate when the specified skill set includes skills that are relatively independent of one another (which is typically the case). An example of two skills that are typically independent of one another are "Employee Benefits" and "Inventory." Because call center skills are usually independent of one another, the normalized Euclidean measure is used as the default analysis technique. With reference to FIG. 2, the normalized Euclidean measure analysis method is selected by choosing the second radio button within the selection box 50 labeled "Skills Evaluated Separately."

A third heuristic, referred to herein as the vector dot product measure, computes the dot product between the mean trends of the selected parameters with the observed trend and selects those dates common to all of the specified skills that fall within a tolerance measure (e.g., five or ten percent variation). With reference to FIG. 2, the vector dot product measure is selected by choosing the third radio button within the selection box 50 labeled "User Selected Date."

For the Euclidean measure, the following equation is used:

$$Euclidean = \sqrt{[(A_1 - A_{1avg})^2 + (A_2 - A_{2avg})^2 + \ldots + (A_N - A_{navg})^2]}$$

where i=1 to N is an index; N is an integer; $A_i$ is the $i^{th}$ reference attribute; and $A_{iavg}$ is the mean value (computed) of the $i^{th}$ reference attribute. The Euclidean measure is computed for all skills in common and compared with the specified tolerance to pick representative day(s). For the normalized Euclidean measure, the following equation is used:

$$NormalizedEuclidean = \frac{Euclidean \text{ for one skill data}}{MAX}$$

where MAX is the maximum distance for that skill. This is computed separately for each skill for each specified day and then compared with the tolerance.

The following equation is used for the vector dot product measure:

$$Dot\ Product = \frac{(A_1 \times A_{1avg} + A_2 \times A_{2avg} + \ldots + A_N \times A_{Navg})}{D}$$

where $$D = \sqrt{(A_1^{2+A_2^2+\ldots+A_N^2})} \times \sqrt{(A_{1avg}^{2+A_{2avg}^2+\ldots+A_{Navg}^2})}$$

Before using the vector dot product measure, the ranges of A1 . . . AN are first normalized into a range of 0–100 to prevent dominance. Dominance occurs when users choose reference attributes that have widely differing values. For example, "handle time" is typically in hundreds of seconds while "abandoned calls" is in tens. If the user chooses these two attributes for vector dot product analysis then "handle time" will dominate over "abandoned calls" and nullify the effect thereof. By normalizing values to a uniform range prior to performing the dot product, dominance is prevented from occurring and the analysis is unbiased. Dominance does not generally occur in the Euclidean measure as we only square the difference from the mean for each attribute as opposed to squaring individual attribute values and their means separately in the dot product. In normalized Euclidean measure, normalization is inherent by virtue of the formula. Like the normalized Euclidean measure, the vector dot product measure treats skills separately.

Regardless of the analysis strategy selected by the user, the user must enter a tolerance value which determines the window about the mean trend that will define a "representative" performance. If the tolerance is set too low, there may be no days within the specified analysis period that qualify as representative days. If this occurs, a higher tolerance value must be selected and the analysis repeated. If the tolerance is set too high, a relatively large number of representative days will be identified, which may defeat the purpose of the analysis.

As described above, after one or more representative days have been determined, the analysis server 20 identifies "agent groups" that were working in the call center on those representative days. Each of the agent groups includes one or more agents that have a common set of skills and skill levels. An agent group is identified by examining a list of skills and skill levels of the different agents that were working on the corresponding representative day and determining which agents have the same skills and skill levels. In a preferred approach, different criteria for identifying agent groups are provided. For example, with reference to FIG. 2, the web page 40 includes a selection box 52 that requires the user to indicate a criterion for identifying agent groups on the representative days. In a first criterion, identified as the "exact match" criterion, each agent must share the exact skills and skill levels of the other agents within an agent group in the exact order of administration to be placed within the group. In another criterion, identified as the "functional match" criterion, only a functional match is required (i.e., the order of administration does not matter) to be placed in a specific agent group. The user selects a grouping criterion that he feels will provide the most useful reporting results in support of a decision to be made.

In a subsequent selection box 54, the web page 40 solicits an indication of whether skill filtering should be used in the identification of agent groups. If skill filtering is used, the reports subsequently generated by the analysis server 20 will only include information relating to agent groups that service skills within the specified skill set. If skill filtering is not used, the reports will include information on all agent groups within the call center on the representative days, regardless of their corresponding skills.

A radio button selection approach is used to select skill filtering in the illustrated embodiment. The default setting is no skill filtering.

As described previously, after the user has entered all of the requested information into the web page 40, he presses the "Analyze" button 62 to initiate the analysis. The analysis server 20 then contacts the corresponding call center by dialing the telephone number indicated on line 42. Once connected, the analysis server 20 proceeds to download the call center operations information (also known as call center management system (CMS) data) for the specified analysis period. Among other things, the call center operations information will include agent login/logout data for the days in the specified analysis period. The analysis server 20 then identifies the call center operations information that relates to the skill or skills specified by the user for analysis. This information is then analyzed for the user-specified operating parameters to identify the representative days. As described above, depending upon the analysis strategy selected by the user, the skills specified by the user will either be analyzed separately or together.

The "Reanalyze" Button 64 in the web page 40 of FIG. 2 does essentially the same thing as the "Analyze" button, but analyzes previously downloaded performance data (perhaps using another analysis strategy). This is provided as a time saver for re-analyzing the performance data of a given CMS. Finally, the "Check" button 66 checks to determine whether any previously generated reports are available for a given CMS. Users are generally encouraged to use the "Check" and "Reanalyze" features (in that order) first before using the "Analyze" feature to save time and effort.

In general, to determine a representative day for an operational parameter, a mean value is first calculated for the operational parameter for the entire analysis period. Mean values are also calculated for the operational parameter for each individual day within the analysis period. A day is considered a "representative" day for that parameter if the day's mean value matches the mean value for the entire analysis period within the specified tolerance window for a given analysis strategy. If multiple operational parameters are specified, the representative day must match the overall mean within the tolerance window for all of the parameters for a given analysis strategy.

After the representative days have been found, the analysis server 20 next identifies the agent groups within those representative days. After the agent groups have been identified, the analysis server 20 then determines the occupancy of the identified agent groups. As described previously, the occupancy of agent group refers to the amount of time that the agent group manned the call center during a corresponding representative day. In a preferred approach, the occupancy of the agent group is determined based upon sub-intervals of the representative day. For example, in a preferred embodiment, the representative day is split into a number of 30-minute intervals. If an agent in a first agent group mans the call center during an entire 30-minute interval, he contributes a 1 toward the first agent group's total occupancy for the corresponding representative day. If an agent in the first agent group mans the call center for only a portion of a 30-minute interval (e.g., 15 minutes), he contributes only a fraction (e.g., 0.5) toward the group's total occupancy for that day.

To get the total occupancy for the agent group on a particular representative day, the values for each of the agents in the group for each of the 30-minute intervals during that day are added together. For example, suppose an agent group having a single agent is identified for a first representative day. The agent logged in at the call center at 8:00 AM on the representative day and logged out at 8:45 AM and didn't log in again that day. The occupancy for this agent group would therefore be 1.5 for the representative day because the agent was logged in for the entire 30-minute interval between 8:00 and 8:30 AM (i.e., an occupancy of 1 for this interval) and the agent was logged in for half of the 30-minute interval between 8:30 AM and 9:00 AM (i.e., an occupancy of 0.5 for this interval). Adding the occupancies for the two intervals together results in a total occupancy value of 1.5.

In another example, suppose another agent group on the representative day consists of three agents. All of these agents logged in at 9:00 PM and logged out at 11:45 PM on the representative day. The period between 9:00 PM and 11:30 PM consists of five 30-minute intervals, all of which were fully manned by the three agents. Therefore, this period contributes a value of 3×5=15 to the total occupancy of the group for the representative day. The 30-minute interval between 11:30 PM and midnight, however, was only occupied for 15 minutes by each of the three agents. This interval, therefore, only contributes a value of 3×0.5=1.5 to the total occupancy of the group for the representative day. The total occupancy of this agent group for the representative day is therefore 15+1.5=16.5.

A problem arises when one or more agents within an agent group logs in on the day before a representative day and logs out on the representative day. A similar problem arises when one or more agents within an agent group logs in on the representative day and logs out on the following day. In such cases, the analysis server 20 will normally only consider the 30-minute intervals that occur during the representative day in determining the occupancy for the group on the representative day. However, a system that considers all of the 30-minute intervals continuously occupied by an agent within an agent group, as long as one or more of the 30-minute intervals occur on the representative day, can also be implemented in accordance with the present invention. In one embodiment of the invention, the analysis server 20 analyzes call center operations data for the day before each representative day and/or the day after each representative day, in addition to the data for the representative day itself, when determining occupancy values for the representative day.

After the analysis server 20 has determined the occupancy values for the representative day(s), it proceeds to generate various reports for each of the representative days. The analysis server 20 then presents a new web page to the user showing a list of the identified representative days with the corresponding reports listed underneath. For example, FIG. 4 is a screen snapshot illustrating analysis results that are reported to a user after performing an analysis using a normalized Euclidean measure strategy having a tolerance of 20. As illustrated, the analysis server 20 has identified seven representative days within the analysis period and has generated three different reports for each of the representative days. The user can review any of the generated reports by clicking on the hypertext listing for the report using a mouse or similar pointing device. FIG. 5 is a screen snapshot illustrating analysis results that are reported to a user after performing an analysis of the same call center data using a Euclidean measure strategy having a tolerance of 300. As illustrated, only two representative days have been identified using the Euclidean strategy. In addition, only one of the two identified representative days (i.e., Apr. 2, 1999) is the same as a representative day identified using the normalized Euclidean measure.

As shown in FIGS. 4 and 5, three different report formats are provided in the illustrated embodiment. These formats are entitled the "Agent Composition Summary Report", the "Agent Composition Typewise Interval Report", and the "Agent Composition Intervalwise Type Report." FIG. 6 is a screen snapshot illustrating a typical "Agent Composition Summary Report" for a representative day in accordance with one embodiment of the present invention. As illustrated, the report provides a list identifying each of the agent groups for the representative day (i.e., under the heading "Type"), the total occupancy value for each group on the representative day (i.e., under the heading "Qty"), the individual agent log IDs for each member of the agent group, the time intervals during which each group was logged in on the representative day, and the skills and skill levels supported by each agent group.

FIGS. 7 and 8 are screen snapshots illustrating a typical "Agent Composition Typewise Interval Report" for a representative day in accordance with one embodiment of the present invention. As illustrated, this report provides essentially the same information as the report illustrated in FIG. 6. However, for each agent group, the occupancy data is broken out into 30-minute time intervals during the representative day. As shown, only the 30-minute intervals that were at least partially occupied by an agent group during the representative day are listed for that group. This report thus provides a quick reference showing which time intervals were occupied by each individual agent group during the representative day.

FIG. 9 is a screen snapshot illustrating a portion of a typical "Agent Composition Intervalwise Type Report" in accordance with one embodiment of the present invention. As illustrated, this report breaks down the representative day into 30-minute intervals and then reports, for each 30-minute interval, the individual occupancy contributions from each agent group during that 30-minute interval. Note that some intervals have been left out in FIG. 9 for purposes of illustration. This report thus provides a quick reference showing which groups were active during each individual time interval during the representative day.

In one embodiment of the present invention, the analysis server 20 of FIG. 1 is capable of performing daylight savings time corrections based upon the location of the call center being analyzed. Often, the time stored in the CMS is in Greenwich Mean Time and this needs to be converted to the call center's local time before the reports are generated. In a preferred approach, this time correction is performed automatically for each call center by the analysis server 20 based upon knowledge of each call center's location.

Figure 10:
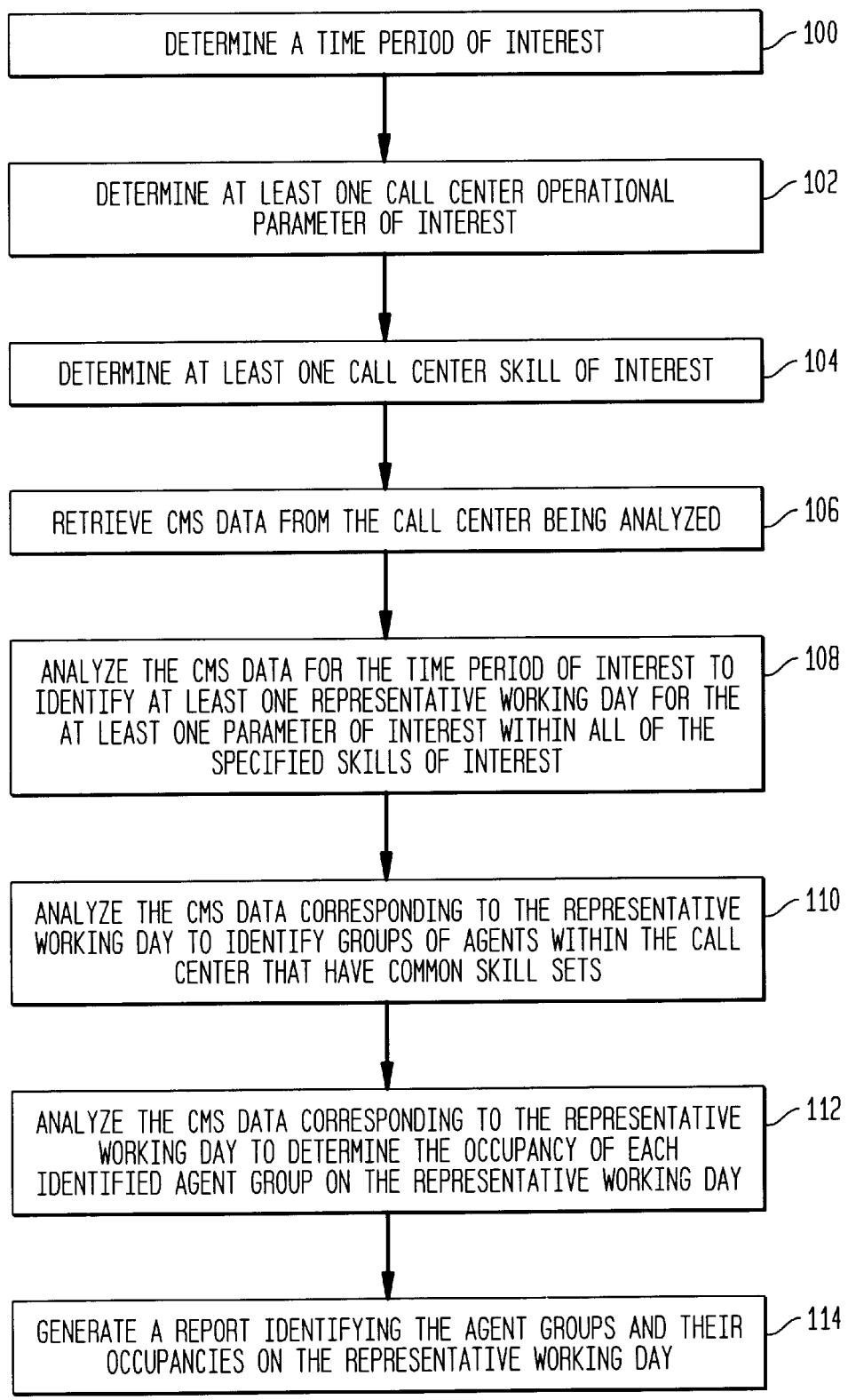
FIG. 10 is a flowchart illustrating a method for processing call center operations data in accordance with one embodiment of the present invention.

FIG. 10 is a flowchart illustrating a method for processing call center operations data within a digital processor to generate information that is useful for decision support in a call center. First, an analysis time period of interest is determined (step 100). At least one call center operational parameter of interest is then determined (step 102). Next, at least one call center skill of interest is determined (step 104). Call center operations data is then retrieved from a memory associated with the call center being analyzed (step 106). If the method is being implemented within a digital processor that is remote from the call center being analyzed, an intervening communication medium or network is generally used to retrieve the required operations information from the call center. If the method is being implemented in a digital processor located at the call center, the operations information can be retrieved from the memory device directly. Other methods for retrieving operations data are also possible in accordance with present invention.

The call center operations data is next analyzed for the time period of interest to identify one or more representative working days within the time period of interest for the at least one parameter of interest and all the specified skills of interest (step 108). The call center operations data corresponding to each representative working day is next analyzed to identify agent groups within the call center on the representative day (step 110). Each of the agent groups will include agents that have the same skill sets as the other agents in the group and, preferably, the same skill levels as the other agents in the group. The call center operations data for each representative working day (and possibly the day before and/or after the representative working day) is then analyzed to determine the occupancy of each identified agent group on the representative working day (step 112). After the occupancy information has been determined, one or more reports are generated identifying the agent groups and their occupancies on each representative working day (step 114). These reports can subsequently be displayed or printed for a user.

Although the present invention has been described in conjunction with its preferred embodiments, it is to be understood that modifications and variations may be resorted to without departing from the spirit and scope of the invention as those skilled in the art readily understand. For example, the inventive principles are not limited to use within a client/server environment but can also be used, for example, within a dedicated processor unit located within a call center. In one embodiment, for example, the inventive principles are implemented within a software program stored on a computer readable medium, such as one or more floppy disks or CD-ROM disks. The computer readable medium can then be transferred to a call center location to be loaded into a call center computer unit for use in analyzing call center operations data at the call center itself. Such modifications and variations are considered to be within the purview and scope of the invention and the appended claims.

What is claimed is:

1. A computer automated system for use in analyzing call center data for a call center that is adapted to handle a plurality of different call center skills using a plurality of human agents, comprising:

an analysis server being in communication with at least one call center and being operable to:
(a) obtain operations data corresponding to operations within the call center over a period of time comprising multiple days;
(b) analyze said operations data to identify at least one representative day within said period of time for at least one user-specified call center parameter and at least one user-specified call center skill, said at least one representative day being a day that falls within a mean performance range for said at least one user-specified call center parameter and said at least one user-specified call center skill; and
(c) identify an agent group within the call center for said at least one representative day, said agent group being a subset of said plurality of human agents and including at least one agent, each agent within said agent group having a common set of skills to other agents within said agent group.

2. The system claimed in claim 1,
wherein said analysis server is further operable to (d) determine a total occupancy level for said agent group based on an amount of time that agents within said agent group were manning the call center during said at least one representative day.

3. The system claimed in claim 1, wherein said analysis server is further operable to (d) generate an occupancy report for said at least one representative day illustrating, for each of a plurality of different time intervals during said at least one representative day, a value indicating how many agents within said agent group were manning the call center for the full duration of each time interval, wherein said value can include a fractional value.

4. The system claimed in claim 1, wherein said analysis server is further operable to (d) generate an agent composition report for said at least one representative day illustrating the skills of said agent group and an identifier corresponding to each agent within said agent group.

5. The system claimed in claim 1, wherein:

said analysis server is further operable to (d) contact a remote call center via an intervening network.

6. The system claimed in claim 1, wherein:

said analysis server is further operable to (d) dial a user-specified telephone number associated with the at least one call center.

7. The system claimed in claim 1, wherein:

said analysis server is further operable to (d) access a local memory located at the call center.

8. The system claimed in claim 1, wherein:

said period of time is a user-specified value.

9. The system claimed in claim 1, wherein:

said analysis server is capable of using multiple different analysis techniques, wherein the particular analysis technique that is used to analyze said operations data is specified by the user.

10. The system claimed in claim 9, wherein:

said multiple different analysis techniques includes a first analysis technique that analyzes all of said at least one user-specified call center skills together and a second analysis technique that analyzes each of said at least one user-specified call center skills separately.

11. The system claimed in claim 1, wherein:

said at least one user-specified call center parameter includes at least one of the following: call volume, average speed of answer, number of abandoned calls, and call handling time.

12. The system claimed in claim 1, wherein:

said analysis server is further operable to (d) determine a first mean value for a first call center parameter over said entire period of time.

13. The system claimed in claim 12, wherein:

said analysis server is further operable to (d) compare a parameter value related to said first call center parameter corresponding to a particular day within said period of time to said first mean value.

14. The system claimed in claim 1, wherein:

each agent within said agent group has the same skill levels for said common set of skills as other agents within said agent group.

15. The system claimed in claim 1, wherein said analysis server is further operable to (d) identify additional agent groups within the call center for said at least one representative day.

16. The system claimed in claim 15, wherein:

said analysis server is operable only to identify agent groups that are associated with said at least one user-specified call center skill.

17. The system claimed in claim 1, wherein:

said computer automated system is a client-server system that can be accessed by a plurality of different users.

18. The system claimed in claim 1, wherein:

said computer automated system is a web-based tool that can be accessed by authorized users via an Internet connection.

19. The system claimed in claim 1, wherein:

said computer automated system is implemented within a digital processor located at the call center.

20. The system claimed in claim 1, wherein:

said operations data includes at least agent login/logout data for said period of time.

21. A method for use in analyzing operations data for a call center having a plurality of human agents, comprising the steps of:

retrieving operations data for the call center from a memory unit;

first analyzing said operations data in a digital processor to identify at least one representative time period corresponding to one or more user-specified metric parameters for one or more user-specified call center skills, the at least one representative time period being related to a mean value for said at least one user-specified metric parameters; and second analyzing said operations data in a digital processor to identify at least one agent group within the call center on said at least one representative time period, said at least one agent group being a subset of said plurality of human agents and having at least one agent, each agent within said at least one agent group having a common set of skills to other agents within said at least one agent group.

22. The method claimed in claim 21, wherein:

each agent within said at least one agent group has the same skill levels for said common set of skills as other agents within said at least one agent group.

23. The method claimed in claim 21, further comprising the step of:

third analyzing said operations data in a digital processor to determine an occupancy of said at least one agent group within said call center on said at least one representative time period, said occupancy indicating an amount of time that agents within said at least one agent group were manning the call center on said at least one representative time period.

24. The method claimed in claim 23, further comprising the step of:

fourth analyzing said operations data in a digital processor to determine, for each of a plurality of different time intervals during said at least one representative period, a value indicating how many agents within said agent group were manning the call center for the full duration of said time interval, wherein said value can include a fractional value.

25. The method claimed in claim 21, wherein:

said step of first analyzing includes determining a mean value for a first user-specified metric parameter over a user-specified period of time, said user-specified period of time including multiple days.

26. The method claimed in claim 25, wherein:

said one or more user-specified call center skills includes multiple skills; and said step of determining a mean value includes determining a single mean value for the first user-specified metric parameter for all of said multiple skills.

27. The method claimed in claim 25, wherein:

said one or more user-specified call center skills includes multiple skills; and said step of determining a mean value includes determining a separate mean value for the first user-specified metric parameter for each of said multiple skills.

28. A computer readable medium having a program stored thereon for performing the method of claim 21 when loaded within a digital processing device.

29. A method for use within a digital processor for analyzing operations data for a call center having a plurality of human agents, said call center being adapted to handle a plurality of different call center skills, said method comprising the steps of:

determining a user-specified analysis period, said user-specified analysis period comprising multiple days;

determining at least one user-specified call center operating parameter;

determining at least one user-specified call center skill;

retrieving operations data for the call center from a memory device associated with the call center, said operations data covering at least said user-specified analysis period; and processing said operations data to identify a representative day within said user-specified analysis period, said representative day being a day that displays a performance within a mean performance range for said at least one user-specified call center operating parameter and said at least one user-specified call center skill.

30. The method claimed in claim 29, wherein:

said step of determining a user-specified analysis period includes receiving user input via a graphical user interface (GUI).

31. The method claimed in claim 30, wherein:

said GUI is part of an Internet web page.

32. The method claimed in claim 29, wherein:

said step of retrieving operations data includes determining a call center address and using said call center address to connect to said call center via an intervening communication network.

33. The method claimed in claim 32, wherein:

said step of determining a call center address includes determining a user-specified telephone number associated with said call center.

34. The method claimed in claim 29, wherein:

said steps of determining at least one user-specified call center operating parameter and determining at least one user-specified call center skill includes receiving user input via a graphical user interface (GUI).

35. The method claimed in claim 29, further comprising the step of:

analyzing said operations data to identify at least one agent group within the call center on said representative day, said at least one agent group comprising a subset of said plurality of human agents and having at least one agent, each agent within said at least one agent group having a common set of skills as other agents within said at least one agent group.

36. The method claimed in claim 29, further comprising the step of:

determining an occupancy level for said at least one agent group based on an amount of time that agents within said agent group were logged in during said representative day.

37. The method claimed in claim 29, further comprising the step of:

determining a user-specified tolerance level for use in calculating said mean performance range for said at least one user-specified call center operating parameter.

38. The method claimed in claim 29, further comprising the step of:

determining a user-specified processing technique for use in said step of processing said operations data, said user-specified processing technique being selected by a user from a plurality of predetermined processing techniques.

39. A computer readable medium having a program stored thereon for use in performing the method of claim 29 when loaded into a digital processing device.

40. An apparatus for analyzing operations data for a call center having a plurality of human agents, said call center being adapted to handle a plurality of different call center skills, said apparatus comprising:

means for determining a user-specified analysis period, said user-specified analysis period comprising multiple days;

means for determining at least one user-specified call center operating parameter;

means for determining at least one user-specified call center skill;

means for retrieving operations data for the call center from a memory device associated with the call center, said operations data covering at least said user-specified analysis period; and means for processing said operations data to identify a representative day within said user-specified analysis period, said representative day being a day that displays a performance within a mean performance range for said at least one user-specified call center operating parameter and said at least one user-specified call center skill.

41. The apparatus claimed in claim 40, wherein:

said apparatus is a client/server based analysis tool that is accessed by a user via a network connection.

42. The apparatus claimed in claim 40, wherein:

said means for determining a user-specified analysis period, said means for determining at least one user-specified call center operating parameter, and said means for determining at least one user-specified call center skill each include means for obtaining data from a computer input device associated with a user.

43. The apparatus claimed in claim 40, wherein:

said means for determining a user-specified analysis period, said means for determining at least one user-specified call center operating parameter, and said means for determining at least one user-specified call center skill each include a graphical user interface (GUI).

44. The apparatus claimed in claim 40, further comprising:

means for determining a user-specified processing method for use by said means for processing.

45. The system claimed in claim 1, wherein said analysis server identifies said representative day using at least one of the following techniques: Euclidean measure, normalized Euclidean measure, and vector dot measure.

46. The method claimed in claim 21, wherein, in said first analyzing step, the at least one representative time period is identified using at least one of the following techniques:

Euclidean measure, normalized Euclidean measure, and vector dot measure.

47. The method claimed in claim 21, wherein, in said second analyzing step, skill filtering is used in the identification of the at least one agent group.

48. The method claimed in claim 21, wherein said first analyzing step comprises the following substeps:

first calculating an overall mean value for the one or more user-specified metric parameters over a selected number of time periods within an analysis period; and discarding a selected time period from further analysis in the second analyzing step, when a mean value for the one or more user-specified parameters during the selected time period fails to fall within a specified range of the overall mean value.

49. The method of claim 48, wherein each of the selected time periods not discarded in the discarding step is considered a representative time interval.

50. The method of claim 49, wherein the second analyzing step comprises the following substeps:

for each representative time interval, identifying the at least one agent group within the call center;

for each of the identified at least one agent groups, determining a corresponding occupancy value.

* * * * *

UNITED STATES PATENT AND TRADEMARK OFFICE
CERTIFICATE OF CORRECTION

PATENT NO. : 6,711,253 B1
DATED : March 23, 2004
INVENTOR(S) : G.C. Prabhakar

It is certified that error appears in the above-identified patent and that said Letters Patent is hereby corrected as shown below:

<u>Title page</u>,
Item [75], Inventors, change "Prabhaker," to -- Prabhakar --.

Signed and Sealed this

Seventh Day of September, 2004

JON W. DUDAS
*Director of the United States Patent and Trademark Office*